United States Patent [19]

Kawamura

[11] Patent Number: 4,507,685
[45] Date of Patent: Mar. 26, 1985

[54] IMAGE RECORDING DEVICE

[75] Inventor: Naoto Kawamura, Inagi, Japan

[73] Assignee: Canon Kabushiki Kaisha, Tokyo, Japan

[21] Appl. No.: 392,335

[22] Filed: Jun. 25, 1982

[51] Int. Cl.³ ............................................. H04N 1/40
[52] U.S. Cl. ..................................... 358/283; 358/78
[58] Field of Search .................. 358/75, 78, 80, 283, 358/280, 285, 284

[56] References Cited

U.S. PATENT DOCUMENTS 4,238,768 12/1980 Mitsuya .............................. 358/283
4,258,393 3/1981 Ejiri .................................... 358/283
4,308,553 12/1981 Roetling ............................. 358/75

Primary Examiner—Michael A. Masinick
Attorney, Agent, or Firm—Fitzpatrick, Cella, Harper & Scinto

[57] ABSTRACT

An image recording apparatus capable of arbitrarily setting a screen angle for recording a screen dot image is disclosed. The apparatus is constructed with an image signal output device; a level signal output device to produce a plurality of output level signals as a group, and to change the sequence of output of said group of signals; a quantized signal generator to generate quantized signals in accordance with the image signals and the level signals; and image recording signal generator to generate image recording signals for image recording by an output from the quantized signal generator.

12 Claims, 23 Drawing Figures

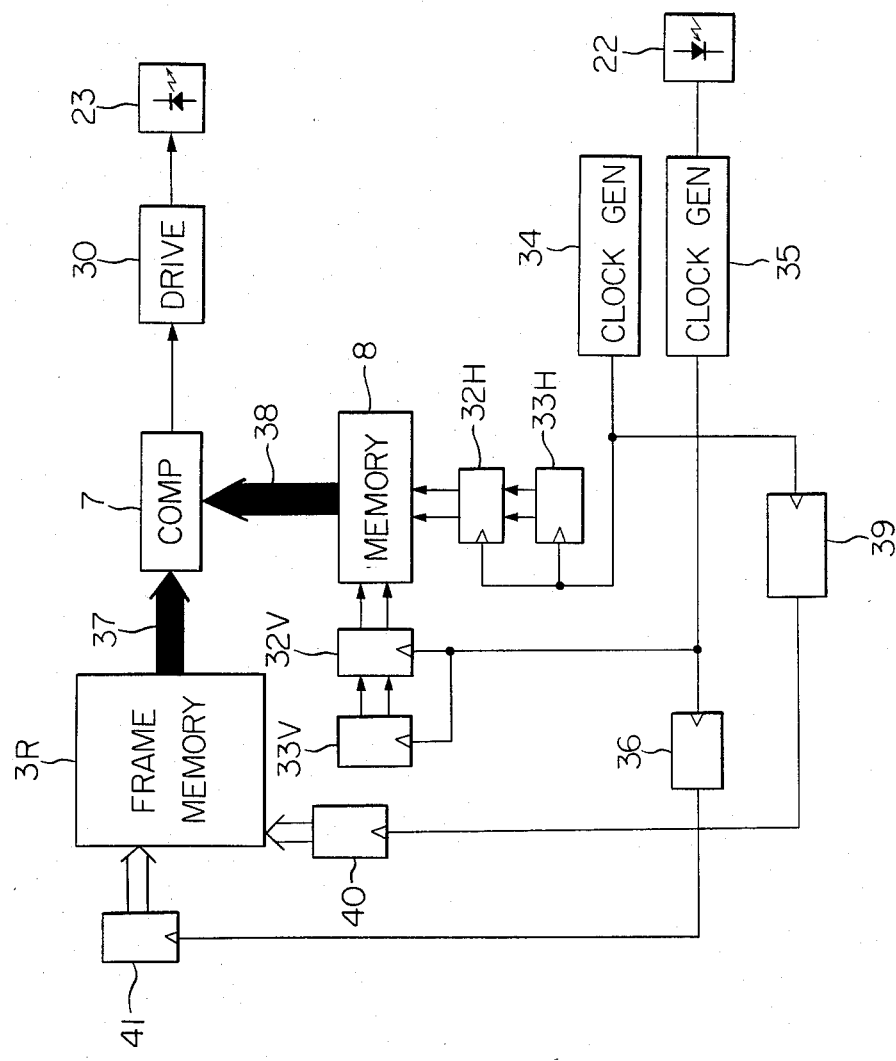
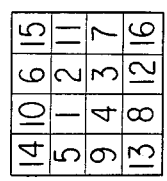
FIG. 5
FIG. 6

| 14 | 10 | 6  | 15 | 5  | 1  | 2  | 11 | 9  | 4  | 3  | 7  | 13 | 8  | 12 | 16 | 14 | 10 | 6  | 15 |
|----|----|----|----|----|----|----|----|----|----|----|----|----|----|----|----|----|----|----|----|
| 5  | 1  | 2  | 11 | 9  | 4  | 3  | 7  | 13 | 8  | 12 | 16 | 14 | 10 | 6  | 15 | 5  | 1  | 2  | 11 |
| 9  | 4  | 3  | 7  | 13 | 8  | 12 | 16 | 14 | 10 | 6  | 15 | 5  | 1  | 2  | 11 | 9  | 4  | 3  | 7  |
| 13 | 8  | 12 | 16 | 14 | 10 | 6  | 15 | 5  | 1  | 2  | 11 | 9  | 4  | 3  | 7  | 13 | 8  | 12 | 16 |
| 15 | 14 | 10 | 6  | 11 | 5  | 1  | 2  | 7  | 9  | 4  | 3  | 16 | 13 | 8  | 12 | 15 | 14 | 10 | 6  |
| 11 | 5  | 1  | 2  | 7  | 9  | 4  | 3  | 16 | 13 | 8  | 12 | 15 | 14 | 10 | 6  | 11 | 5  | 1  | 2  |
| 7  | 9  | 4  | 3  | 16 | 11 | 8  | 12 | 15 | 14 | 10 | 6  | 11 | 5  | 1  | 2  | 7  | 9  | 4  | 3  |
| 16 | 13 | 8  | 12 | 15 | 14 | 10 | 6  | 11 | 5  | 1  | 2  | 7  | 9  | 4  | 3  | 16 | 13 | 8  | 12 |
| 6  | 15 | 14 | 10 | 2  | 11 | 5  | 1  | 3  | 7  | 9  | 4  | 12 | 16 | 13 | 8  | 6  | 15 | 14 | 10 |
| 2  | 11 | 5  | 1  | 3  | 7  | 9  | 4  | 12 | 16 | 13 | 8  | 6  | 15 | 14 | 10 | 2  | 11 | 5  | 1  |
| 3  | 7  | 9  | 4  | 12 | 16 | 13 | 8  | 6  | 15 | 14 | 10 | 2  | 11 | 5  | 1  | 3  | 7  | 9  | 4  |
| 12 | 16 | 13 | 8  | 6  | 15 | 14 | 10 | 2  | 11 | 5  | 1  | 3  | 7  | 9  | 4  | 12 | 16 | 13 | 8  |
| 10 | 6  | 15 | 14 | 1  | 2  | 11 | 5  | 4  | 3  | 7  | 9  | 8  | 12 | 16 | 13 | 10 | 6  | 15 | 14 |
| 1  | 2  | 11 | 5  | 4  | 3  | 7  | 9  | 8  | 12 | 16 | 13 | 10 | 6  | 5  | 14 | 1  | 2  | 11 | 5  |
| 4  | 3  | 7  | 9  | 8  | 12 | 16 | 13 | 10 | 6  | 15 | 14 | 1  | 2  | 11 | 5  | 4  | 3  | 7  | 9  |
| 8  | 12 | 16 | 13 | 10 | 6  | 15 | 14 | 1  | 2  | 11 | 5  | 4  | 3  | 7  | 9  | 8  | 12 | 16 | 13 |

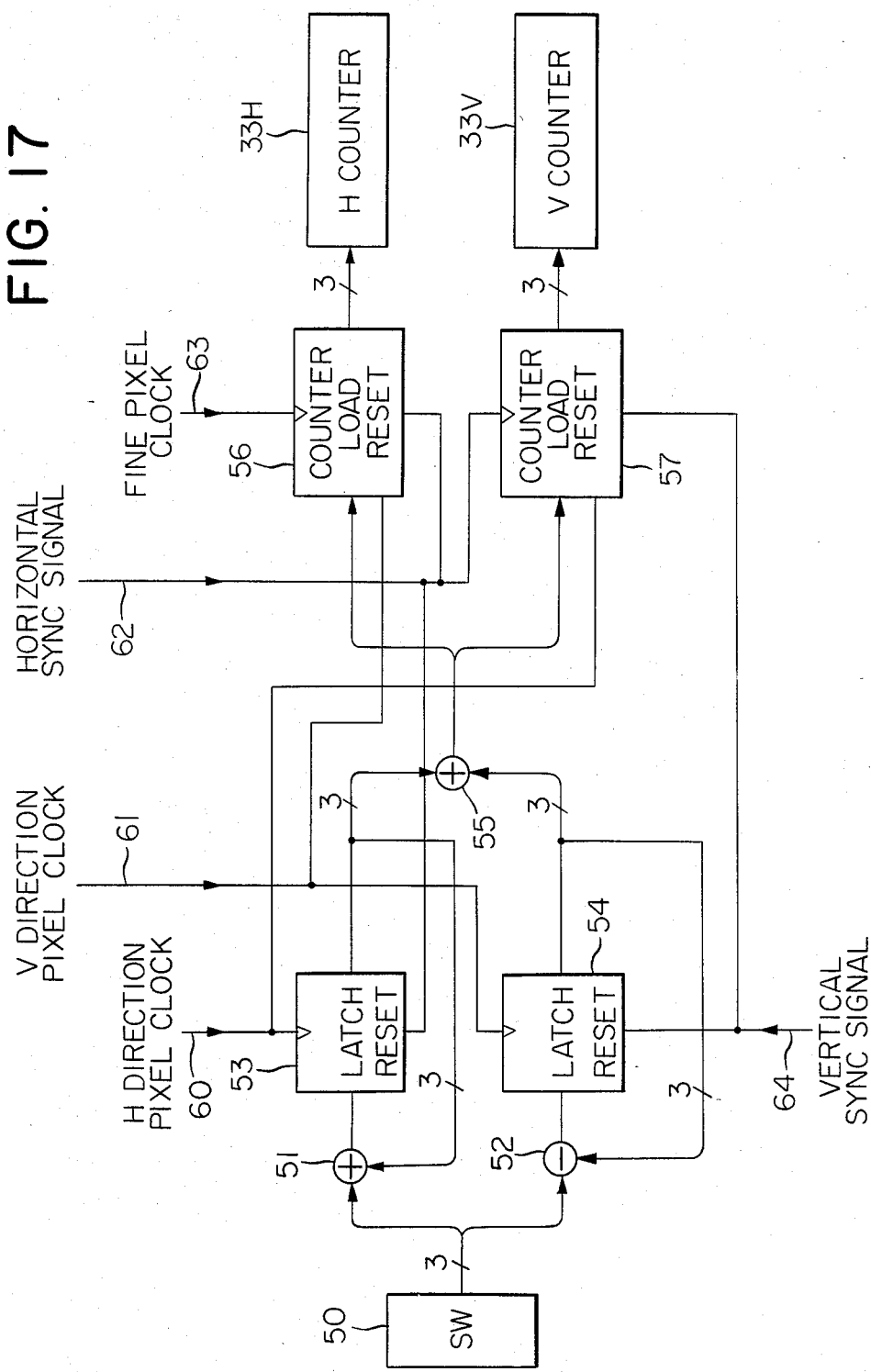

IMAGE RECORDING DEVICE

BACKGROUND OF THE INVENTION

1. Field of the Invention

This invention relates to an image recording device.

2. Description of the Prior Art

It has heretofore been a common practice in the color image printing that, in making a screen plate, the angle of a dotted screen for the screen plate is varied for each and every color component. The reason for varying the screen angle is to prevent Moiré fringes from occurring due to synthesis of the component colors. For example, the screen angle is varied with respect to the horizontal scanning direction such that a magenta plate is at zero degree, a yellow plate is inclined by 15°, a cyan plate by 30°, and a black plate by 60°; or a magenta plate is inclined by 15°, a cyan plate by 30°, a yellow plate by 40°, and a black plate by 90°. Further, for varying the screen angle, a contact screen is used. This contact screen, however, has varieties of disadvantages including that its service life is short.

As a device for varying the screen angle without using the contact screen, there is a screen-covered scanner which imparts to a light source a light modulation corresponding to the contact screen to thereby prepare a screen-dot image without use of such contact screen. In order to set an arbitrary screen angle in such device, an auxiliary scanning is mostly conducted at a particular angle with respect to the principal scanning. For instance, as disclosed in Japanese Patent Publication No. 55-31462, an arbitrary screen angle is set by conducting the auxiliary scanning through deflection of an oscillatory mirror in a galvano-meter, in a addition to the principal scanning by revolution of a mirror.

Owing to necessity for the auxiliary scanning by the oscillating mirror, etc., however, the above-mentioned conventional device has disadvantages such that it is expensive, and that adjustment and handling of the mirror are complicated and troublesome.

SUMMARY OF THE INVENTION

It is an object of the present invention to provide an image recording device capable of obtaining an image output of a high quality.

It is another object of the present invention to provide an image recording device of a simplified construction and yet which is capable of obtaining an image faithful to the original.

It is still another object of the present invention to provide an image recording device capable of readily setting an arbitrary screen angle.

It is other object of the present invention to provide an image recording device capable of forming a uniform lattice space.

It is still other object of the present invention to provide an image recording device capable of obtaining the optimum color image.

It is further object of the present invention to provide an image recording device capable of readily preventing Moiré fringes from occurring.

BRIEF DESCRIPTION OF THE DRAWING

FIG. 5 is a block diagram showing one embodiment, wherein the present invention is applied to a screen dot imaging system;

FIG. 6 is a "4×4" threshold value matrix diagram;

FIG. 17 is a block diagram showing the circuit construction of one embodiment for arbitrarily setting a screen angle when one image element consists of "8×8" fine image elements.

DETAILED DESCRIPTION OF PREFERRED EMBODIMENTS

In the following, the present invention will be described in specific details of its preferred embodiments with reference to the accompanying drawing.

Figure 1:
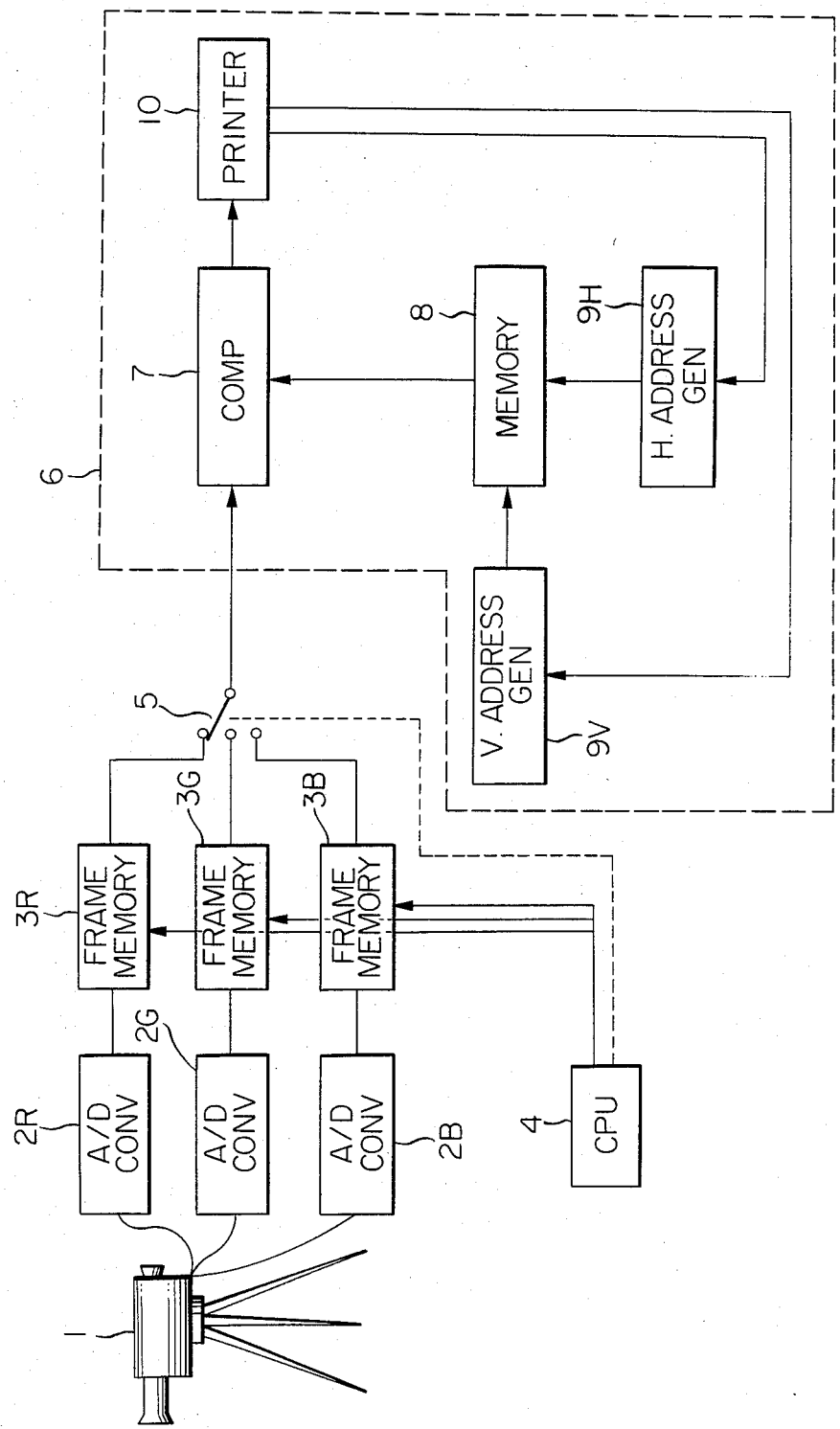
FIG. 1 is a block diagram showing a construction of one embodiment of the image recording device according to the present invention.

FIG. 1 shows one embodiment of the basic construction of the image recording device according to the present invention. In the drawing, a reference numeral 1 designates a color television camera; 2R, 2G and 2B refer to A/D converters which convert image signal inputs for red, green and blue into respective digital image signals; 3R, 3G and 3B refer to frame memories which store therein one image portion of digital image signals in red, green and blue respectively. These frame memories 3R, 3G and 3B are controlled by a central processing unit (CPU) 4 for their write-in and read-out operations. Reading outputs from these red, green and blue frame memories are sequentially transferred to a screen dot image recorder 6 by switching of a change-over switch 5 under the CPU control. The control operations by the CPU 4 for the writing and reading of information as well as switching of the change-over switch 5 can be done by a well known microcomputer. That is, such operations can be effected by programming the output operations of each and every frame memory in a switchable manner so that quantization for each color becomes possible.

The screen dot recorder 6 is constructed with a comparator 7, a memory 8, a horizontal address generator 9H, a vertical address generator 9V and a recording device 10 such as, for example, a laser beam printer. From the frame memories 3R, 3G, 3B, brightness data outputs are produced for each image element. Also, output data are produced from the memory 8 in correspondence to fine image elements constituting each image element. The both output data are compared by the comparator 7 and quantized to perform on-off operations of the laser beam in the recording device 10.

Figure 2:
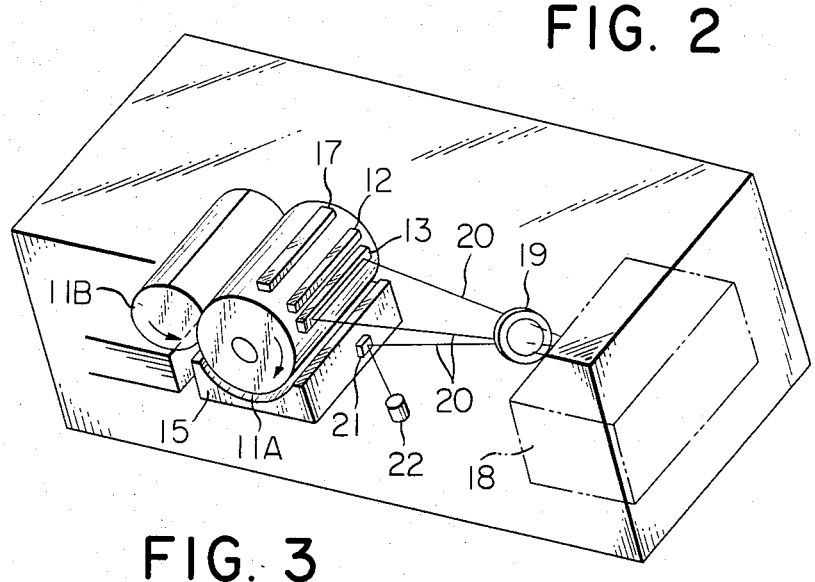
FIGS. 2 and 3 are respectively a perspective view and a side view of the image recording device shown in FIG. 1.
Figure 3:
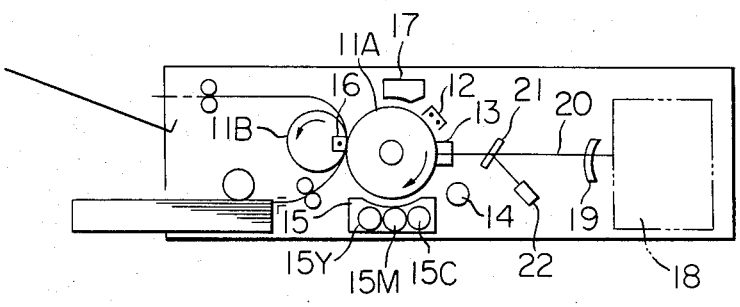
Figure 4:
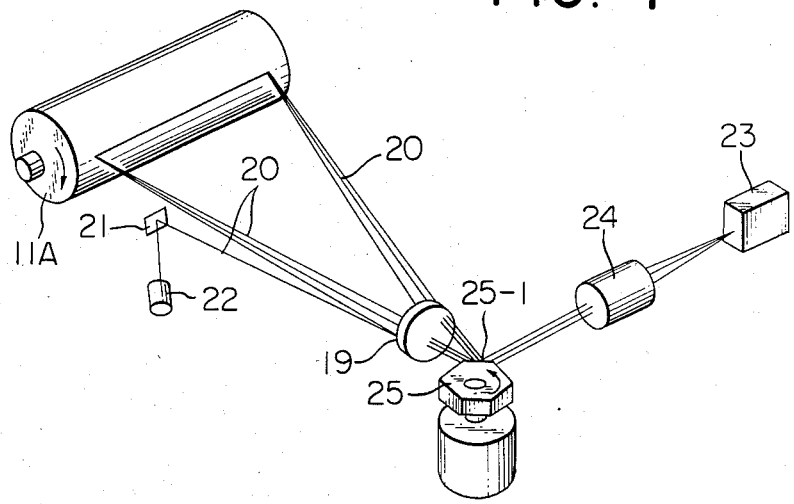
FIG. 4 is a perspective view showing one embodiment of an optical system used in the image recording device of FIG. 1.

FIGS. 2, 3 and 4 illustrate one example of the recording device 10. In the drawing, a reference numeral 11A designates a photosensitive drum, a numeral 11B refers to arrows an image transfer drum. These drums 11A, 11B rotate in the directions of the respective arrows. Along the rotational direction of the photosensitive drum 11A, there are sequentially arranged around the drum a primary charger 12, an exposure and simultaneous charging device 13, an overall exposure device 14, a developing device 15, an image transfer charger 16, and a cleaning section 17. A numeral 18 refers to a light beam scanning section for emitting a light beam to a condenser lens 19 in the optical system shown in FIG. 4.

In FIG. 4, details of the optical system of the present embodiment are shown, in which light beams projected from a semiconductor laser oscillator 23 are rendered parallel light beams by means of a collimator lens 24, and are incident on a rotatory polygonal mirror 25 rotating at a high speed. The light beams incident on the rotatory polygonal mirror 25 are reflected by one of the reflecting mirror surfaces 25-1 of the polygonal mirror 25, after which they pass through the condenser lens 19 as an image forming means and form an image on the photosensitive drum 11A. Thus, the principal scanning is performed in accordance with an angle of reflection of the reflecting mirror surface 25-1 with rotation of the rotatory polygonal mirror 25. The auxiliary scanning is effected by rotation of the photosensitive drum 11A. An input signal $S_{in}$ is fed to the semiconductor laser 23, and an image is formed on the surface of the photosensitive drum 11A by the laser beams, the intensity of which have been modulated by the input signal. In order to generate a horizontal synchronous signal for arranging the start position of each principal scanning, a part of the laser beams is led to a light detector 22 through a mirror 21 when the partial light beam is passing by a position slightly outward of the principal scanning start position of the beams. The horizontal synchronous signal is generated as soon as the light beam enters into this light detector 22. After lapse of a predetermined time since the horizontal synchronous signal is generated, the above-mentioned input signal $S_{in}$ is supplied to the semiconductor laser oscillator 23.

In FIGS. 2 and 3, d.c. corona discharge is applied to the surface of the photosensitive drum 11A while rotating by the primary charger 12 to uniformly charge the photosensitive member on the drum surface either in positive or negative polarity. At the exposure and simultaneous charging section 13, d.c. corona discharge in the polarity opposite to that of the primary charge or a.c. corona discharge is imparted to the photosensitive member, and, simultaneously, the light beam which has been subjected to the principal scanning by the rotatory polygonal mirror 25 is exposed on the photosensitive drum 11A to thereby form an electrostatic latent image on the photosensitive drum 11A. Subsequently, the entire electrostatic latent image on the photosensitive member is uniformly irradiated with light by means of the overall light irradiating device 14 such as a fluorescent lamp to thereby increase a difference in the surface potentials between a portion exposed to the recording light beam and a portion not exposed to it. Thus, an electrostatic latent image with a high image contrast is obtained on the surface of the photosensitive drum 11A.

The above-mentioned electrostatic latent image of high image contrast is visualized by the developing device 15. Such development can be done by the magnet brush method or the fur brush method. Then, a powder image of the image as developed is electrostatically transferred onto a sheet material such as paper held on the peripheral surface of the image transfer drum 11B. The developing device 15 consists of three developing units, as in FIG. 3, i.e., a yellow(Y) unit 15Y, a magenta(M) unit 15M, and a cyan(C) unit 15C. By repeating the development for three times through these units, i.e., by three revolutions of the photosensitive drum 11A, a color original image is transferred onto a sheet of paper held on the image transfer drum 11B. After the image transfer, the photosensitive drum 11A is subjected to cleaning to remove the residual toner on its surface by means of a roller in the cleaning section.

Since the laser beam printer as one example of the recording device 10 is well known, no further details will be given in this specification.

FIG. 5 illustrates further details of one embodiment, wherein the image recording device of the present invention is applied to screen dot recording. In this embodiment, explanations will be made on the red(R) system alone of the three primary colors, i.e., red(R), green(G) and blue(B). The explanations have a already given in reference to FIG. 1 as to controlling the on-off operations of the laser beam by a result obtained from comparison between the output of 3R (vide FIG. 1) and the output of the memory 8. The method of thus controlling the on-off operations of the laser beam and scanning the surface of the photosensitive drum 11A to obtain the image output as shown in FIGS. 2 to 4 is generally called the "density pattern method". This method is to construct one image element on a recording and displaying surface with a matrix element consisting of "L×K" numbers of fine image elements (L and K being positive integers), and to determine a manner of painting each of the fine image elements, i.e., to reproduce intermediate tones by appropriate distribution between "white" fine image elements and "colored" fine image elements.

By constructing the image element with "L×K" numbers of fine image element matrix, there can be obtained an image having "L×K+1" gradation. Such density pattern method has the following advantages.

(1) The recording operation is simple, since a single fine image element can be recorded with a quantized value of black or white.

(2) Owing to simplicity in the recording operation, the "gamma" characteristic of the photosensitive member may be non-linear, hence the method does not depend on the class of the photosensitive member.

Figure 7:
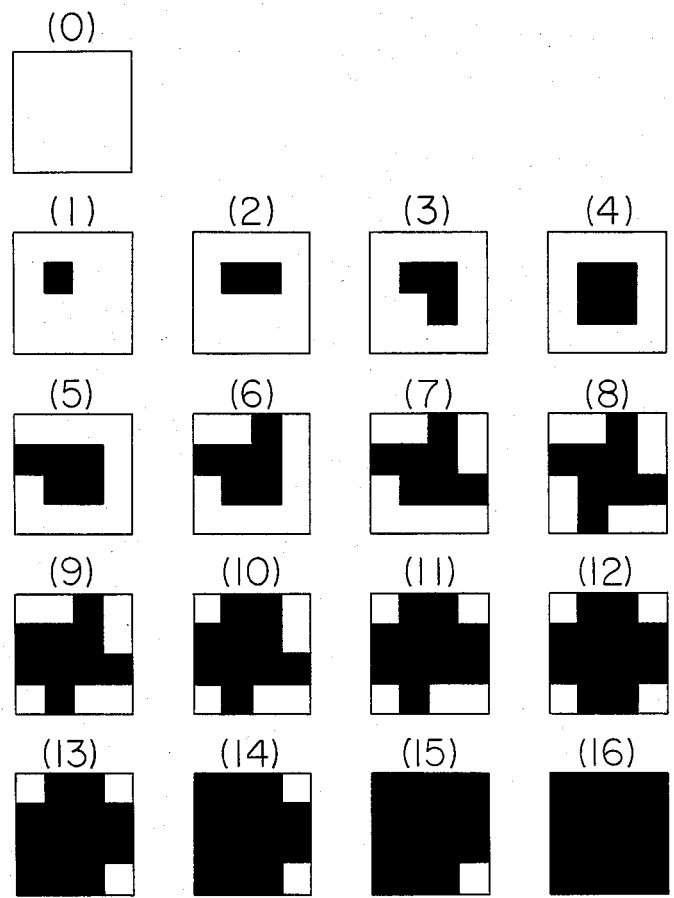
FIG. 7 is a pattern diagram showing the screen dot images which have been formed sequentially in accordance with a sequence of painting the threshold value matrix shown in FIG. 6.

FIG. 6 illustrates an example of constructing one image element with a matrix consisting of 4×4 numbers of fine image elements. A numerical value for each of the fine image elements is called a threshold value which indicates a sequence of painting a corresponding fine image element. The matrix of such image element size is termed a "threshold value matrix". When an intermediate tone is to be reproduced by such image element construction, the fine image elements are sequentially reproduced in the order of the numerical figures in FIG. 6, whereby the brightness in seventeen gradations of 0, 1, 2, 3, ..., 16 (=4×4+1) is obtained. And yet, the way of painting each fine image element is such that the colored portion may be spread from the center of the matrix toward its surrounding in accordance with brightness of the image element, hence the method has a similar effect to the screen dot method. FIG. 7 indicates bright and dark patterns in the seventeen gradations when each and every fine image element is solidly painted in accordance with the above-mentioned sequence of painting.

Referring now to the embodiment of FIG. 5, explanations will be given hereinbelow as to formation of the screen dots by the density pattern method. Output data 37 for brightness of one image element from the frame memory 3R (vide FIG. 1) is compared by the comparator 7 with threshold data 38 for one image element stored in the memory 8.

When the data 37 is greater than the data 38, a signal "1" is output from the comparator 7. Inversely, when the data 37 is smaller than the data 38, a signal "0" is output from the comparator 7. In more detail, the input data 37 for one image element is sequentially compared with the data 38 for each component in the threshold value matrix by means of the comparator 7, and the comparison output "1" is conducted to a laser driving circuit 30 for only a portion where the data 37 is larger than the data 38, i.e., to paint the portion in black, whereby the screen dot as shown in FIG. 7 is formed. The drive circuit 30 controls oscillation of the laser oscillator 23. The light beam 20, which is oscillated from the laser oscillator and scans the surface of the photosensitive drum 11A, has a narrow width which is as wide as a single line consisting of the fine image element.

In the following, explanations will be given as to a case where the threshold value matrix of the image element is "4×4", and the brightness data 37 for each image element in the frame memory 3R are expressed by seventeen-stage values of 0, 1, 2, ..., 16. Assuming that the image element data in the upper left of the image is "8", for example, the data is sequentially compared with the threshold values "14", "10", "6" and "15" for each of the fine image elements of one line in the threshold value matrix in FIG. 6, as the result of which the fine image element having the threshold value "6" alone is painted in solid. For the nature of the beam scanning, the light beam shifts to the next image element at the right of the preceding one in the frame memory 3R (the data of the image element being assumed to be "9"), and the data is sequentially compared with the threshold values "14", "10", "6" and "15" on the first line in the threshold value matrix, same as the preceding case, whereby the fine image element having the threshold value "6" alone is solidly painted in the same way as in the preceding step. Next, the data is compared with data of the third image element at the adjacent right position in the above-mentioned image element. In this way, when the light beam scanning reaches the rightmost end of the first line, it returns to the original position and then the comparison is made between the data "8" of the first image element and the threshold values in the second line of the threshold value matrix, i.e., "5", "1", "2" and "11" in the sequence as designated. As the result of this comparison, those fine image elements corresponding to the threshold values "5", "1" and "2" are solidly painted. In the same manner, when four scanning operations are completed for the image element S of the first line, a pattern (8) shown in FIG. 7 is recorded on the photosensitive drum 11A for the first image element, and a pattern (9) in FIG. 7 for the second image element. From the fifth scanning on, the data of the image element on the second line in the frame memory 3R is compared with each of the threshold values in the threshold value matrix shown in FIG. 6 in the same manner as mentioned in the foregoing. Thus, as soon as the comparison is terminated between the image element of the last line in the frame memory 3R and the threshold values of the fine image elements in the memory 8, a full image is recorded by the density pattern method as the screen dot image.

The foregoing explanations have been made with respect to a case of using the "4×4" threshold value matrix. Similarly, explanations can be made readily with respect to a case of using "L×K" threshold value matrix (L≠K).

In FIG. 5, when one of those fine image elements in the "L×K" threshold value matrix stored in the memory 8 is to be selected and the threshold value data 38 therefor is to be taken out, there will be used the horizontal address generating counter 32H and the vertical address generating counter 32V. The counter 32H is driven by clock signals from the clock generator 34 for the fine image elements. The counter 32V is driven upon its receipt of a scanning start signal from the light detector 22 (vide FIG. 4) through the horizontal synchronous signal generator 35. In order to select one image element stored in the frame memory 3R when the fine image elements are of same the "L×L" threshold value matrix construction as mentioned above, the following operations are conducted: for the horizontal direction, the horizontal counter 40 is driven by clock signals obtained from frequency-division into 1/K of the clock signals from the fine image element clock generator 34 by means of the horizontal clock generator 39 for the image element; and, for the vertical direction, the vertical counter 41 is driven by clock signals obtained by frequency-division into 1/L of the output clock signals from the horizontal synchronous signal generator 35 by means of the counter 36. When a particular image element is selected, the brightness data 37 for the image element is produced as an output to the comparator 7. In FIG. 5, a reference numeral 33H designates a horizontal initial value setting counter, and 33V refers to a vertical initial value setting counter. When these counters 33H, 33V are set at "0", there will be performed horizontal scanning from the upper left side with respect to the image stored in the frame memory 3R, as already mentioned in the foregoing, and scanning of the image element on one line is completed at every L times scanning. In this manner, when the counter 41 sequentially designates the bottom line of the image element, and the L times horizontal scanning operations are completed for the entire lines of the image element, a pattern of the full image is recorded.

Figure 8:
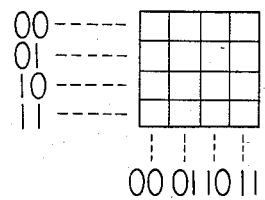
FIG. 8 is an explanatory diagram of address for each element of a "4×4" fine image element matrix.
Figure 9:
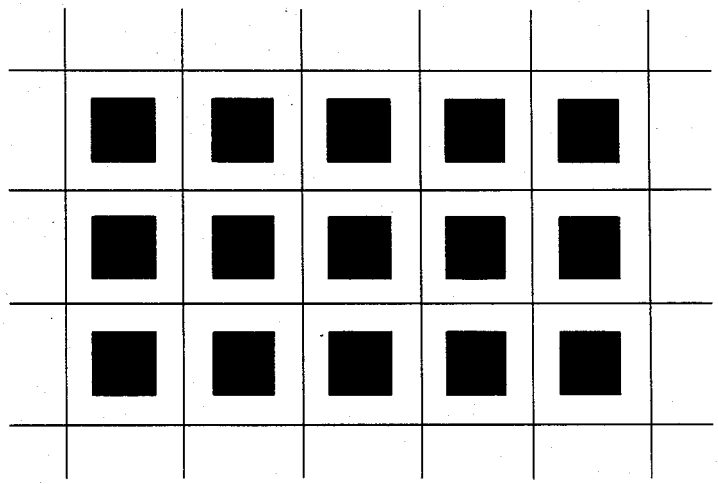
FIG. 9 is a pattern diagram showing the screen dot image when the entire image elements have their brightness of "4" when the fine image element matrix shown in FIG. 6 is used.
Figures 10A, 10B:
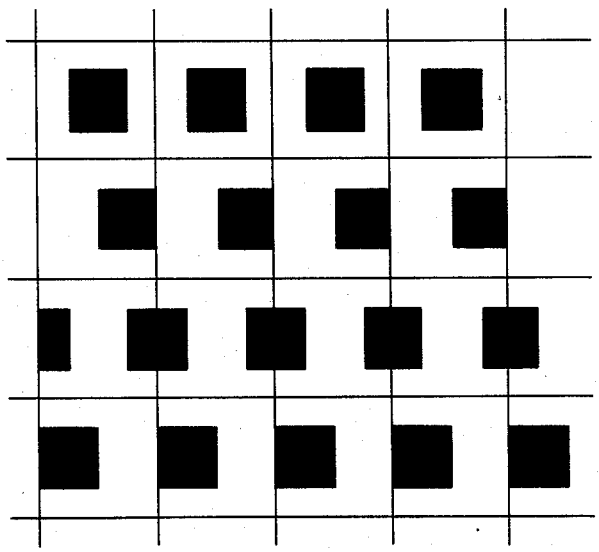
FIG. 10A is a threshold value pattern diagram when a reading position of the horizontal threshold value matrix is sequentially shifted.
FIG. 10B is a pattern diagram of the screen dot images corresponding to the pattern diagram shown in FIG. 10B.

The horizontal address generator 9H and vertical address generator 9V shown in FIG. 1 correspond respectively to a combination of the counters 32H and 33H, and another combination of the counters 32V and 33V. FIG. 8 illustrates the horizontal addresses (00), (01), (10) and (11), and the vertical addresses (00), (01), (10) and (11) of each of the fine image elements in the "4×4" threshold value matrix. By designating both of these addresses by means of the counters 32H and 32V, each of the fine image elements can be selected from the memory 8. In the case of using the fine image elements of the "4×4" threshold value matrix, if the brightness data 37 of the entire image elements in the frame memory 3R is "4" as the result of designating the initial value setting counters 33H and 33V in the address (00), there can be obtained a screen dot image (4) as shown in FIG. 7, and the equi-density (equi-brightness) screen dot pattern comes out as shown in FIG. 9. That is, the screen angle in this case is zero degree (or 90°). In the next place, when the initial value of the counter 33H is subtracted from the preceding value one by one for each line of each image element in the horizontal direction alone, there is obtained a threshold pattern as shown in FIG. 10A, and its image pattern becomes as shown in FIG. 10B. The screen angle $\theta_1$ with respect to the vertical angle of this image is represented as:

$$\theta_1 = \tan^{-1} \tfrac{1}{4} \approx 14 \text{ degrees.}$$

Generally, in an image element consisting of "L×K" numbers of fine image elements, when the initial value of the initial value setting counter 33H is subtracted by i in the horizontal direction alone, the screen angle $\theta_1$ to the vertical direction can be given as follows.

$$\theta_1 = \tan^{-1}\left(\frac{i}{L}\right). \tag{1}$$

That is to say, by changing the value i, the screen angle $\theta_1$ can be appropriately varied.

Further, in an image element consisting of "L×K" numbers of fine image elements when the initial value of the counter 33V is proceeded by n in the vertical direction alone, a screen angle $\theta_2$ to the horizontal direction can be given as follows.

$$\theta_2 = \tan^{-1}\left(\frac{n}{K}\right) \tag{2}$$

That is to say, by changing the value n, the screen angle $\theta_2$ can be appropriately varied.

Figures 11A, 11B:
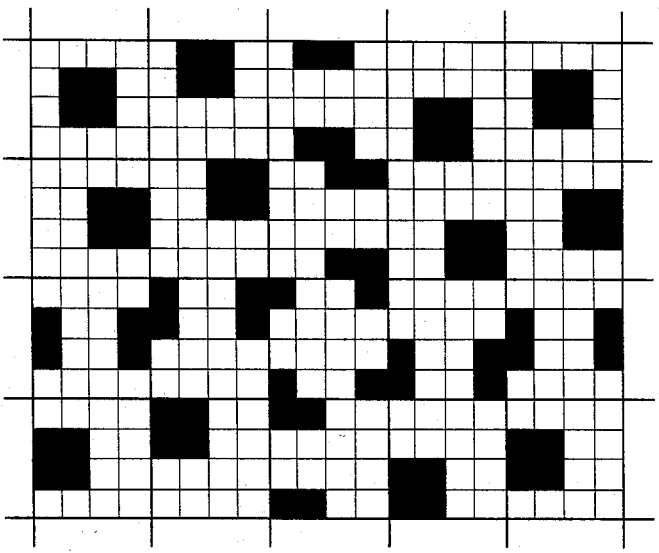
FIG. 11A is a threshold value pattern diagram when the reading position of the threshold value matrix in both horizontal and vertical directions is sequentially shifted.
FIG. 11B is a pattern diagram showing the screen dot images corresponding to that shown in FIG. 11A.

FIG. 11A indicates a threshold pattern when the initial value setting counter 33 V when its setting is counted up one by one in the vertical direction. The output screen dot pattern to be obtained from this count up is as shown in FIG. 11B. As is the case with the previous embodiment, the screen is inclined by approximately 14 degrees with respect to the vertical direction, and its inclination to the horizontal direction is also approximately 14 degrees.

Figure 12:
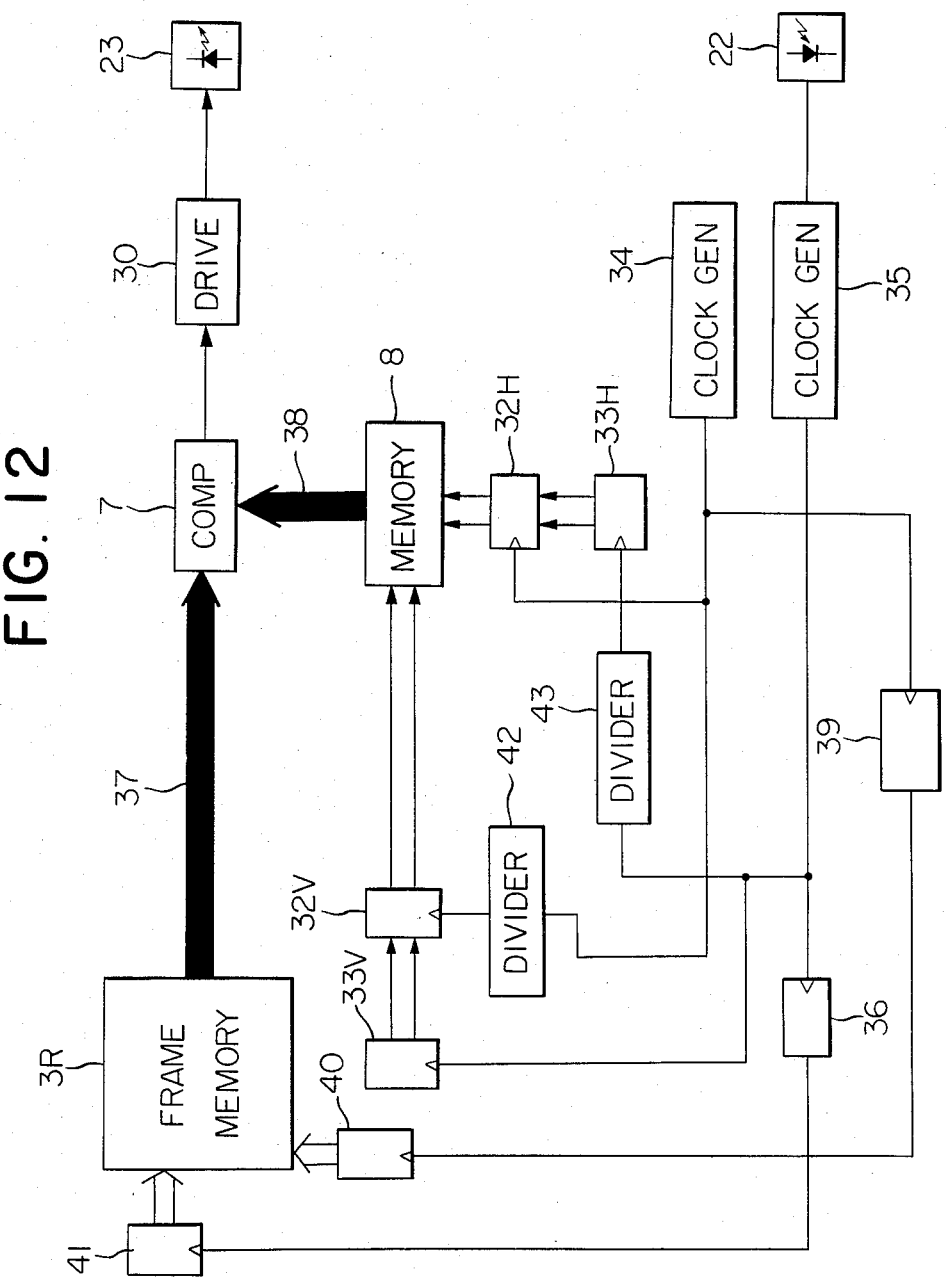
FIG. 12 is a block diagram of a circuit for obtaining the threshold value pattern as shown in FIG. 11A.

FIG. 12 shows a block diagram of a circuit to produce an output threshold pattern as shown in FIG. 11A. The block diagram of FIG. 12 will be explained hereinbelow, taking the "L×K" threshold value matrix as an example. As was the case with the explanations of the FIG. 5 embodiment, when one of the fine image elements in the "L×K" threshold value matrix stored in the memory 8 is to be selected and the threshold value data 38 is to be taken out, there will be used the horizontal address generating counter 32H and the vertical address generating counter 32V. The counter 32H is driven by clock signals from the fine image element clock generator 34. The counter 32V is driven by clock signals obtained by frequency-division into 1/K of the clock signals from the fine image element clock generator 34 by a frequency-divider 42. In order to select one image element stored in the frame memory 3R when the fine image elements are of the "L×K" threshold value matrix construction, the following operations are conducted: for the horizontal direction, the horizontal counter 40 is driven by the clock signals obtained by frequency-division into 1/K of the clock signals from the fine image element clock generator 34 by means of the horizontal clock generator 39 for the image element; and, for the vertical direction, the vertical counter 41 is driven by the clock signals obtained by frequency-division into 1/L of the output clock signals from the horizontal synchronous signal generator 35 by means of the counter 36. When a particular image element is selected, the brightness data 37 of the image element is output to the comparator 7. A numeral 33H refers to the horizontal initial value setting counter, and 33V refers to the vertical initial value setting counter. The horizontal initial value setting counter 33H is driven by the clock signals obtained by frequency-division into 1/L of a signal from the light detector 22 (vide FIG. 4) by the frequency-divider 43. Accordingly, the initial value address in the threshold value matrix moves in the horizontal direction at every time the one-line scanning of the image element is complete. The vertical initial value setting counter 33V is driven by a scanning start signal from the light detector 22 through the horizontal synchronous signal generator 35. When both horizontal initial value setting counter 33H and vertical initial value setting counter 33V are set at "0", the horizontal scanning is performed from the upper left corner with respect to the image stored in the frame memory 3R, as already mentioned in the foregoing, whereby the one line scanning of the image element terminates for every L times of the scanning. In this manner, when the counter 41 finally designates the bottom line of the image element and the L times horizontal scanning to this image element line is completed, a pattern of the full image can be recorded.

In FIG. 11B, the shapes of the screen dots differ from position to position for the reason that the numbers of the fine image elements are as small as "4×4". When large numbers are taken for the fine image elements, e.g., a matrix construction of "8×8", there will be no difference in the shape of the screen dots depending on their positions. Thus, by changing the start position for reading of the threshold value matrix corresponding to one image element of an input stored in the memory 8, an arbitrary screen angle can be obtained.

This phenomenon will be explained in more generalized terms, as follows. That is to say, explanations will be given with reference to the drawing as to a case, wherein, in an image formed with an image element consisting of "L×K" fine image elements and those image elements formed in contiguity to the image element in its horizontal (H) direction and vertical (V) direction, a position of a fine image element constituting the center of the image element with respect to the adjacent image element in the H-direction and the adjacent image element in the V-direction is advanced for a particular value in both the H- and the V-directions.

Figure 13:
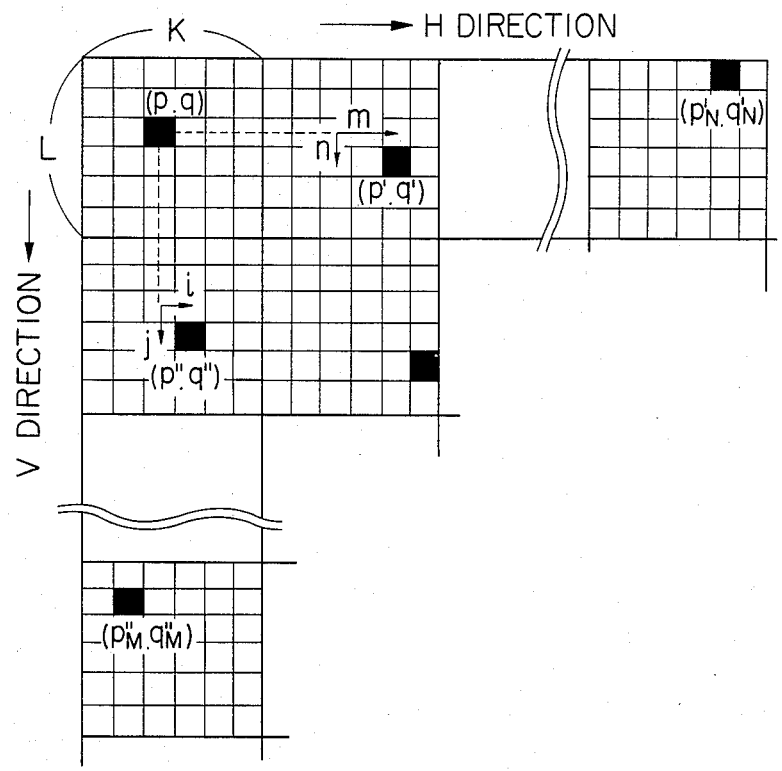
FIG. 13 is a diagram showing each and every symbol representing a positional difference between the central fine image element of the screen dot of the first image element in an image formed by the image elements based on the fine image element matrix of "L(lines)×K(rows)" and the central fine image element in the mutually adjacent image elements in both horizontal and vertical directions.

FIG. 13 shows an image, one image element of which is constructed with "L(lines)×K(rows)" of fine image element matrix, wherein the position of the fine image element to be the center of the screen dot of the first or head image element (the one at the upper left end corner) is set at (p, g) where $1 \leq p \leq K$ and $1 \leq g \leq L$; the position of the fine image element to be the center of the screen dot of the adjacent image element in the H-direction is advanced by m in the H-direction, and by n in the V-direction; and the position of the fine image element to be the center of the screen dot of the image element adjacent in the V-direction is advanced by i in the H-direction and by j in the V-direction.

The position of the fine image element to be the center of the screen dot of the N'th image element in the H-direction is represented by:

$$(p'_N, g'_N) = (p + Nm, g + Nn); \mod(K, L);$$

while the position of the fine image element to be the center of the screen dot of the M'th image in the V-direction is represented by:

$$(p''_M, g''_N) = (p + Mi, g + Mj); \mod(K, L)$$

(where: mod(K, L) is meant by addition of K and L as the moduli in the H- and V-directions respectively).

It has been experimentally verified that, in general, where those values m, n, i and j (all being positive integers) are taken arbitrarily, inconveniences occur in some cases such that the screen angle lacks continuity and uniformity. Cases of such inconvenience will be explained hereinbelow with reference to simple instances as shown in FIGS. 14A, 14B and 14C.

Figure 14A:
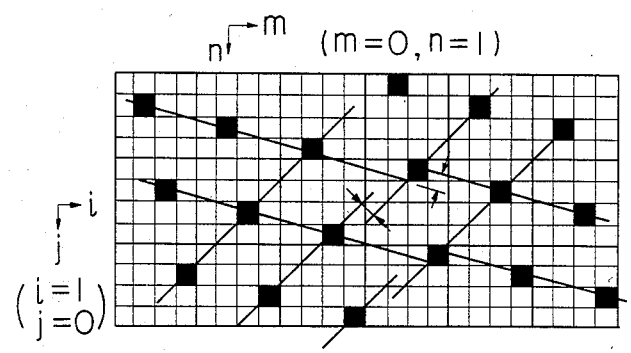
FIGS. 14A, 14B and 14C are respectively actual diagrams of FIG. 13, wherein the fine image elements are in the "4×4" matrix construction, and the central positions of the screen dots do not show the continuous lattice space.
Figure 14B:
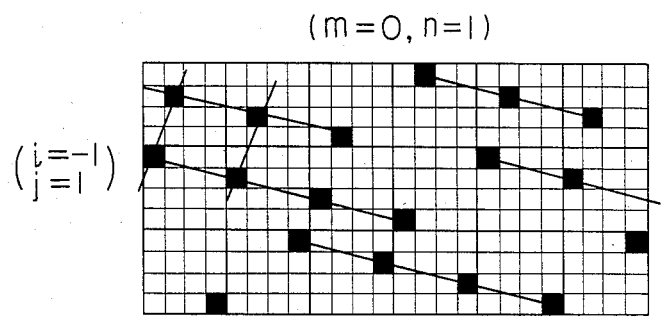
Figure 14C:
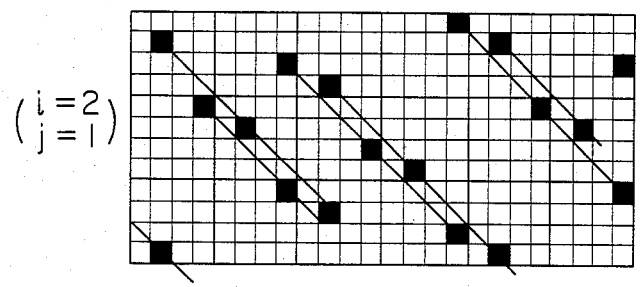

FIGS. 14A, 14B and 14C indicate the screen dot images of K=L=4, wherein FIG. 14A shows a case where m=0, n=1; i=1, j=0; FIG. 14B shows a case where m=0, n=1; i=−1, j=−1; and FIG. 14C shows a case where m=2, n=1; i=2, j=−1. These cases in FIGS. 14A, 14B and 14C are disadvantageous in that the center positions of the screen dot do not represent a continuous lattice space.

Figure 15A:
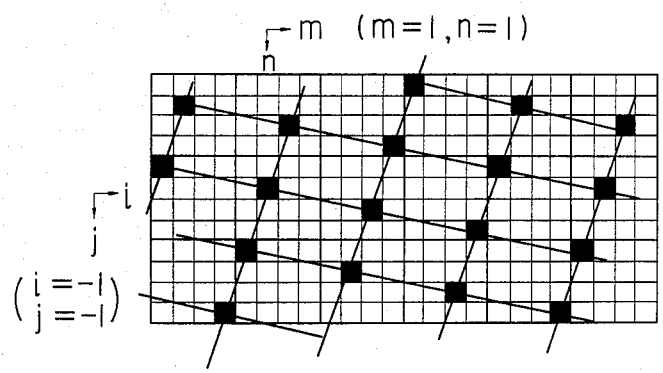
FIGS. 15A, 15B and 15C are respectively the embodiments of the present invention, which show actual diagrams of FIG. 13, and wherein the central positions of the screen dots indicate the continuous lattice space.
Figure 15B:
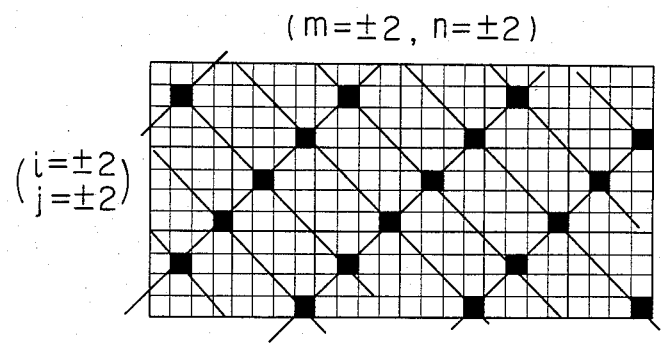
Figure 15C:
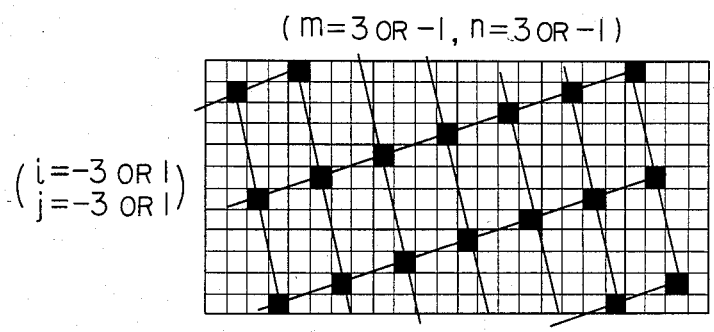

FIGS. 15A, 15B and 15C indicate the screen dot images of K=L=4, wherein FIG. 15A shows a case where m=1, n=1; i=−1, j=−1; FIG. 15B shows a case where m=2, n=−2; i=−2, j=−2 (or m=−2, n=−2; i=2, j=2); and FIG. 15C shows a case where m=3, n=3; i=−3, j=−3 (or m=−1, n=−1; i=1, j=1).

Figure 16:
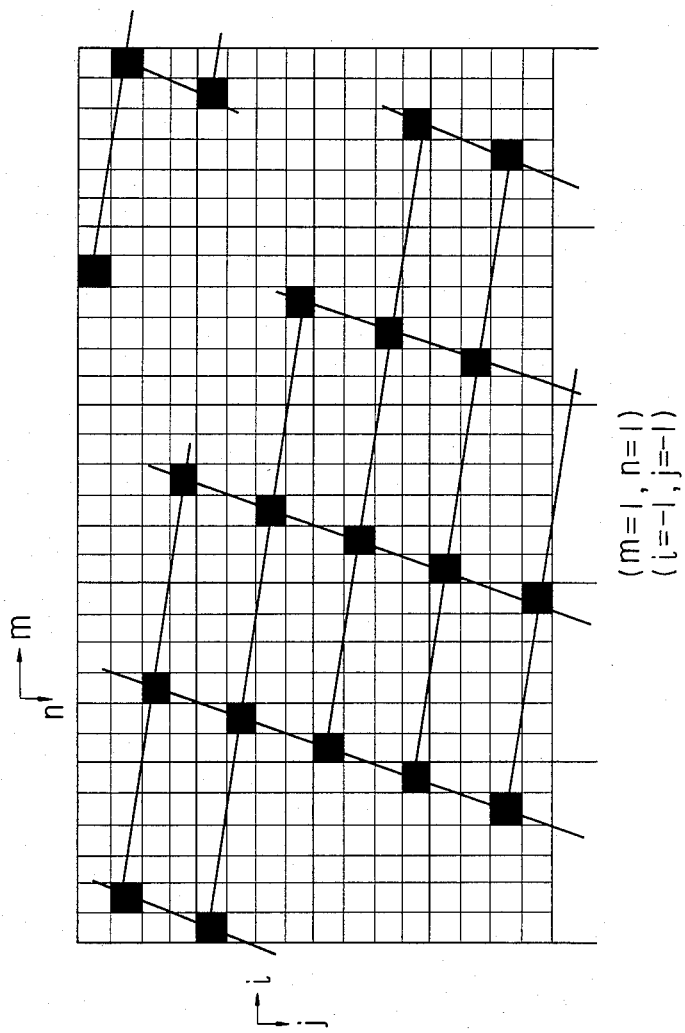
FIG. 16 is an exemplary diagram showing a case where the lattice space is non-uniform because $K \neq L$, even if a part of the conditions according to the present invention is satisfied.

As will be understood from these drawings, each of the lattice points of the fine image elements to be the center of the screen dot together form a uniform lattice space. It has also been recognized as the result of various studies on many instances on the drawing that, in general, each lattice point, (where m=n=α and i=j=−α, forms a uniform lattice space only in the case of K=L. When K≠L, e.g., K=6, L=4 as shown in FIG. 16, each lattice space is non-uniform, even if m=n=1, and i=j=−1.

As stated in the foregoing, the sequential shifting of the screen dot center of each image element adjacent to both H- and V-directions by m=n=α, i=j=−α in the H- and V-directions can also be realized by providing a circuit for introducing input signals from the fine image element clock 34 into the memory vertical initial value setting counter 33V and the memory horizontal initial value setting counter 33H in FIG. 5, e.g., by a circuit shown in FIG. 17.

FIG. 17 shows one embodiment of a circuit for arbitrarily setting the screen angle in case one image element consists of "8×8" fine image elements. In this embodiment, since the single image element consists of "8×8" fine image elements, the address to be imparted to the memory can be three bits each for the H- and V-directions.

Assume now that a data m ($0 \leq m \leq 8$) has been set by a digital switch 50 for setting the screen angle. An output from a latch circuit 53 is fed back to an adder 51, and an output which has been sequentially added by an H-direction image element clock 60 in the latch circuit 53 can be obtained for three bits (i.e., with "8" as the modulus). Since the H-direction image element clock 60 constitutes a single image element with 8 fine image elements, it has a clock cycle eight times as large as that of the fine image element clock.

On the other hand, an output from the latch circuit 54 is sequentially subtracted by a subtractor 52 in response to a V-direction image element clock 61. In this case, too, the output for three bits can be obtained with "8" as the modulus. The V-direction image element clock 61 is output for every eight horizontal lines, i.e., it has a cycle eight times as large as the horizontal synchronous signal 62.

The outputs from the above-mentioned two latch circuits 53, 54 are added by the adder 55, whereby the memory address at the first or head position (the head position for writing in the H-direction) on each recording line is obtained. That is to say, with respect to the H-direction, the output is reset by the horizontal synchronous signal 62 obtained from the light detector 22 in FIG. 4 (zero output), and m, 2m, 3m, . . . : module 8 is obtained by the V-direction image element clock 61; and with respect to the V-direction, the latch 54 and the counter 57 are reset by the vertical synchronous signal 64 which is a scanning start signal. The output from the adder 55 is added to the counters 56, 57, in which the addresses in both H- and V-directions are formed and fed to the counter 33H and 33V, respectively. Here, the H-direction address is first formed by sequential count-up of the clock 63 with the output from the adder 55 as the initial value through application of the fine image element clock 63 to the counter 56. The V-direction address, on the other hand, is formed by feeding the counter 57 the horizontal synchronous signal 62 as the clock, and sequentially counting up the clock 62 with the output from the adder 55 as the initial value. In either case, the output for three bits is taken out with "8" as the modulus.

Thus, by feeding the H- and V-direction address signals as obtained to the counters 33H and 33V, respectively, as the address signals for driving the memory, the above-mentioned screen angle can be obtained.

As described so far, an arbitrary screen angle to form a uniform lattice space can be obtained by rotationally lagging the reading start position of the threshold value matrix stored in the memory by m in both principal and auxiliary scanning directions in sequence with respect to each image element on the lines in the principal scanning direction, and by rotationally lagging the position by −m in both principal and auxiliary scanning directions in sequence with respect to each image element on the lines in the auxiliary scanning direction.

In the above-described embodiment, each of the threshold values in the threshold matrix have been read out of the memory, although it may also be possible to output the threshold value by use of an operational circuit or by other means. Further, the image signals are once stored in the frame memory, which may also be compared with the threshold value matrix in real time. Furthermore, the embodiment utilizes the density pattern method which makes one image element correspond to the entire components in the threshold value matrix, although it may be feasible to use the dither method which makes one image element correspond to one component in the threshold value matrix. In addition, a method intermediate the density pattern method and the dither method such as, for example, a method which makes one image element correspond to a plurality of components out of the entire components in the threshold matrix, can also be employed.

As has been described in the foregoing, the image recording device according to the present invention can successfully prevent Moiré fringes from occurring at the time of the image formation. Hence image output of high quality can be obtained. Also when the present invention is used for recording of color images, for example, there can be obtained optimum reproduction of such color images. Thus, the image recording device according to the present invention has various remarkable effects such that uniform assembly of screen dots having various screen angles to be the bases for the color image formation can be obtained easily and accurately.

Although the invention has been described in the foregoing with reference to a few preferred embodiments thereof, it is not limited to these embodiments alone, but any changes and modifications may be effected within the ambit of the present invention as set forth in the appended claims.

What I claim is:

1. An image recording device, comprising:
   image signal generating means for generating an image signal representing image data;
   means for generating a clock signal;
   binary signal generating means for receiving said image signal and for generating a binary signal from the image data represented thereby, said binary signal generating means generating said binary signal as a binary representation of the image data by sequentially utilizing predetermined parameters each corresponding to a plurality of values;
   selecting means, having count means, for selectively arranging the predetermined parameters in accordance with a count by said count means, said count means counting the clock signal generated by said clock signal generating means in synchronism with said binary signal; and
   recording means for recording an image in accordance with image data represented by said binary signal.

2. An image recording device as set forth in claim 1, wherein said binary signal generating means includes memory means for storing the predetermined parameters each corresponding to a plurality of values.

3. An image recording device as set forth in claim 2, wherein said count means includes an address counter for selecting a reading start position of said plurality of values from said memory means.

4. An image recording device as set forth in claim 3, wherein said clock signal generating means includes a clock generator for reading out said plurality of values.

5. An image recording device as set forth in claim 1, wherein said clock signal generating means generates first and second clock signals and wherein said count means counts said first clock signal in synchronism with said binary signal and said second clock signal in correspondence to a line of said binary signal.

6. An image recording device as set forth in claim 1, wherein said count means includes dividing means for dividing said clock signal synchronized with the binary signal.

7. An image recording device as set forth in claim 1, wherein said binary signal generating means includes a plurality of memory means for storing an image signal for each of a plurality of colors and switching means for switching between the plurality of memory means.

8. An image recording device, comprising:
   image signal output means for producing output image signals in units of an image element;
   means for generating a clock signal;
   binary signal generating means for receiving said image signal and generating a binary signal therefrom, said binary signal generating means forming a threshold matrix corresponding to at least one image element unit in order to generate said binary signal;
   selecting means, having count means, for selectively arranging the thresholds of said threshold matrix in accordance with a count value of said count means, said count means counting the clock signal generated by said clock signal generating means in synchronism with said binary signal; and
   recording means for recording an image in accordance with said binary signal.

9. An image recording device as set forth in claim 8, wherein said binary signal generating means includes a memory for storing therein threshold data for said threshold matrix.

10. An image recording device as set forth in claim 9, wherein said count means includes an address counter for changing a read-out start position for reading said threshold matrix out of said memory by M positions in both principal and auxiliary scanning directions, in sequence, with respect to said threshold matrix in the principal direction, and by -M positions in both principal and auxiliary scanning directions, in sequence, with respect to said threshold matrix in the auxiliary scanning direction.

11. An image recording device as set forth in claim 9, wherein said clock signal generating means generates first and second clock signals and wherein said count means counts said first clock signal in synchronism with said binary signal and said second clock signal in correspondence to a line of said binary signal.

12. An image recording device as set forth in claim 9, wherein said image signal output means includes a plurality of memory means for storing an image signal for each of a plurality of colors and switching means for switching between the plurality of memory means.

* * * * *